(No Model.)
M. F. MEISCH.
VEHICLE WHEEL.
No. 498,479. Patented May 30, 1893.
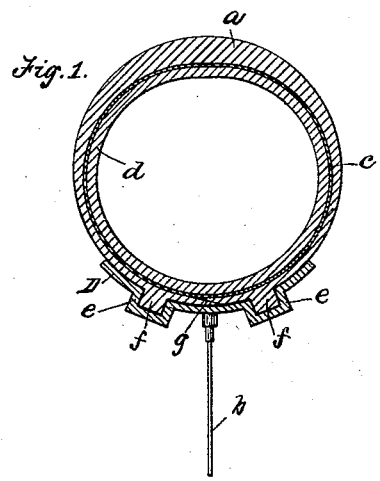
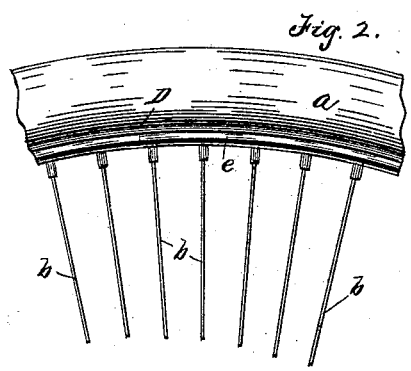
Attest:
M. L. McDermott.
Henry Hart.
Inventor:
M. F. Meisch,
By E. B. Whitmore, Atty.

UNITED STATES PATENT OFFICE.

MICHAEL F. MEISCH, OF ROCHESTER, NEW YORK.

VEHICLE-WHEEL.

SPECIFICATION forming part of Letters Patent No. 498,479, dated May 30, 1893.

Application filed November 14, 1892. Serial No. 451,977. (No model.)

*To all whom it may concern:*

Be it known that I, MICHAEL F. MEISCH, of Rochester, in the county of Monroe and State of New York, have invented a new and useful Improvement in Vehicle-Wheels, which improvement is fully set forth in the following specification and shown in the accompanying drawings.

My present invention relates to bicycle wheels and especially to those upon which pneumatic tires are used, the object of the invention being mainly to construct the parts so that the air-tube may be easily accessible for the purpose of examination and repairs.

The invention is hereinafter more fully described and particularly pointed out.

Referring to the drawings, Figure 1 is a cross section of the rim of the wheel and the tire. Fig. 2, drawn to a smaller scale, shows a portion of the side of the wheel and the tire.

Referring to the parts shown, D is the rim of the wheel, and $b$ the spokes, which latter are of common kind.

$a$ is the shoe of the tire, $c$ the cloth lining and $d$ the air tube, by the inflation of which the shoe is rendered firm, and made tight upon the wheel. The rim of the wheel is formed with two longitudinal grooves $e\ e$, at a distance from its respective edges and parallel therewith, the spokes of the wheel entering the rim in the space between the grooves.

The shoe $a$ is divided longitudinally, and made thickest at the tread of the wheel and thin at its edges and is formed with two ribs, $ff$, near its respective edges and parallel therewith, adapted to enter the grooves $e\ e$ in the rim, as shown, when the tire is put upon the wheel. The edges of the shoe are chamfered or beveled longitudinally so as to form a lap joint, as shown at $g$, the lap being preferably about one-fourth of an inch, at the middle of the rim and between the grooves $e\ e$. The canvas is vulcanized into the inner surface of the shoe, which is rubber; so as to be rigid with the shoe; and it covers the entire inner surface of the shoe from the thin or knife edge on one side to the commencement of the bevel on the other side, so that when the shoe is wrapped around the air tube and closed, the edges of the canvas come together as shown in Fig. 1.

To examine or repair the air tube it is exhausted of air so as to collapse, after which either rib, $ff$, of the shoe, as the case may require, is drawn out of its groove and the edge of the shoe turned back to uncover the air tube. After repairs are made the loose edge of the shoe is returned to place and the rib replaced in the groove. The inflation of the tube is done in the usual manner; and when inflated it presses the ribs firmly into the respective grooves, and holds the shoe securely to place on the wheel.

What I claim as my invention is—

A wheel for bicycles, the rim of which is concaved outwardly, and provided with substantially radial grooves parallel with the edges thereof and with each other, said grooves being substantially semi-rectangular in cross section, and the tire of the wheel is composed of a shoe of unequal thickness and longitudinally divided along its thin side and having its edges chamfered to overlap each other between the grooves of the tire and form a joint, said shoe having two ribs, one near each edge and adapted to form a radial projection when the tire is in place and to fit within the grooves of the tire of the rim, a sheet of cloth secured to the inner face of the shoe, and an air tube within the tire for inflating the tire and causing the ribs upon its surface to enter the grooves in the rim and hold the tire in position, substantially as set forth.

In witness whereof I have hereunto set my hand, this 11th day of November, 1892, in the presence of two subscribing witnesses.

MICHAEL F. MEISCH.

Witnesses:
ENOS B. WHITMORE,
M. L. McDERMOTT.